FRANZ FORSTER
KARL STOLZ
INVENTORS

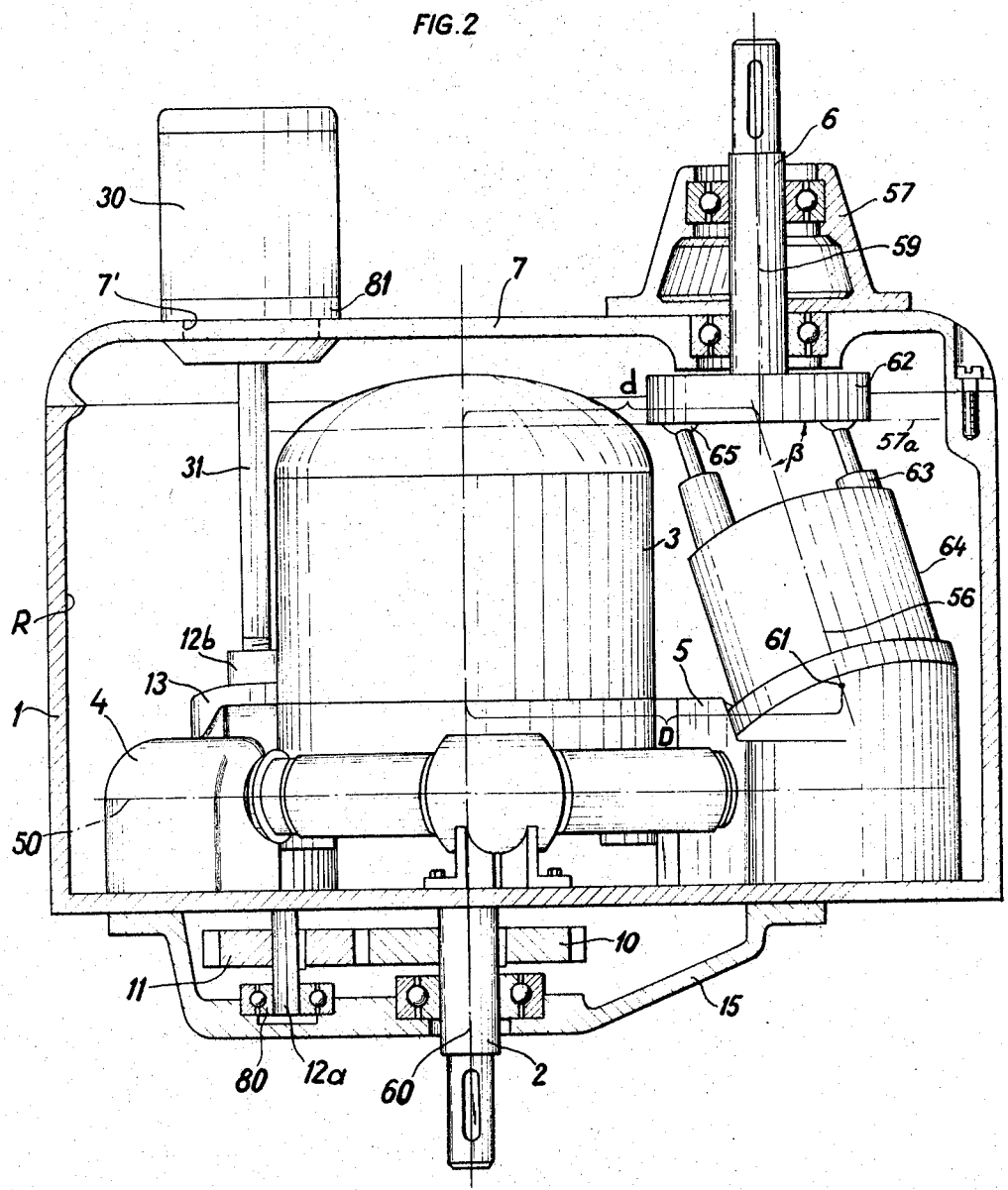

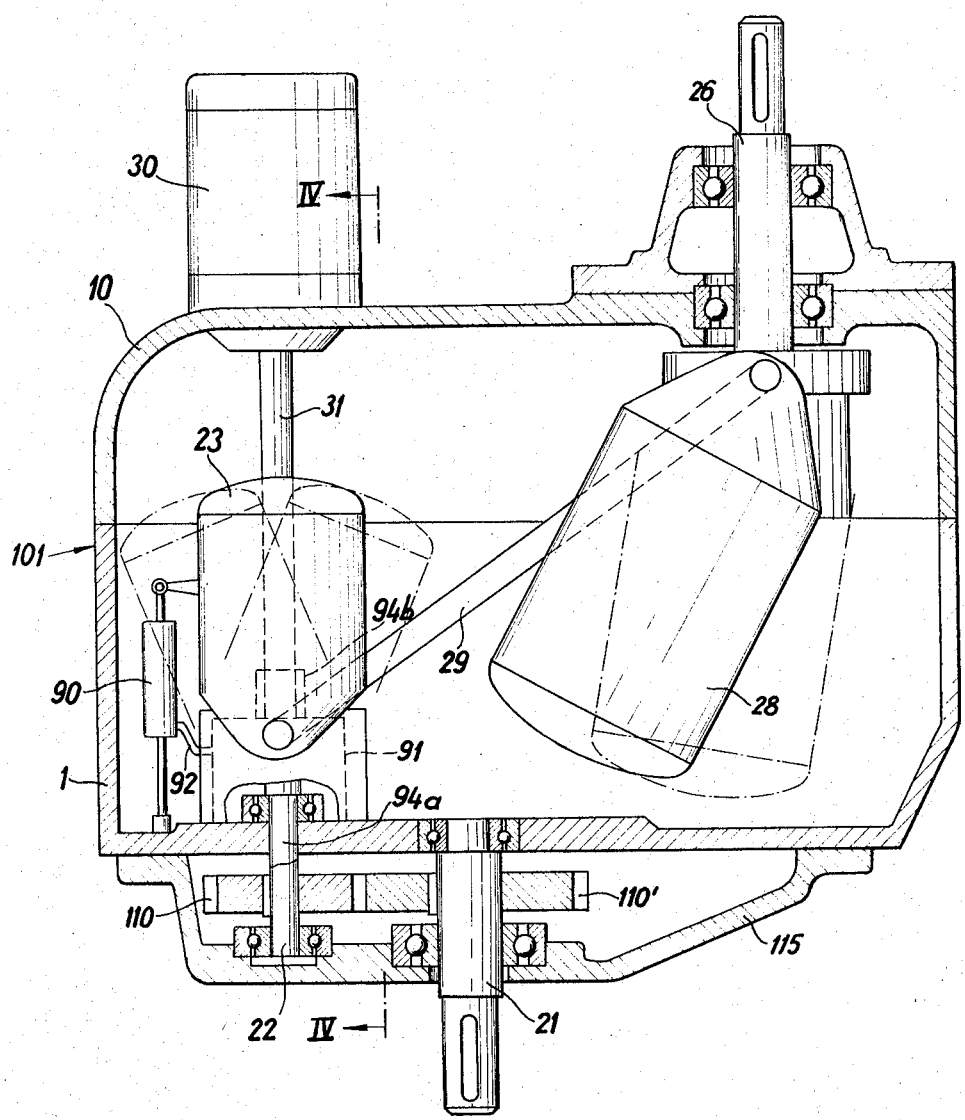

Jan. 24, 1967   F. FORSTER ET AL   3,299,635
ADJUSTABLE HYDROSTATIC DRIVE
Filed April 26, 1965   4 Sheets-Sheet 4
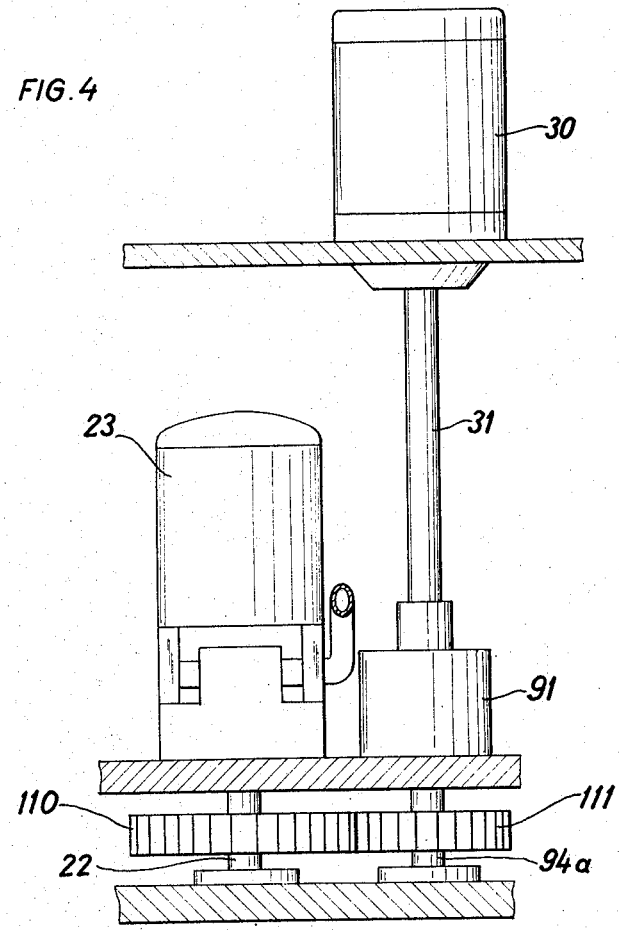
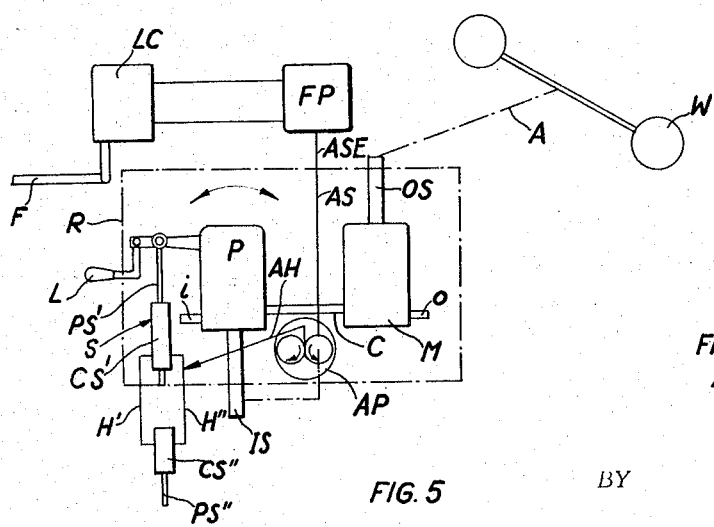
FRANZ FORSTER
KARL STOLZ
   INVENTORS.
BY Karl J. Ross
   Attorney

United States Patent Office 3,299,635
Patented Jan. 24, 1967

3,299,635
ADJUSTABLE HYDROSTATIC DRIVE
Franz Forster, Karlstadt, and Karl Stolz, Strassbessenbach, Germany, assignors to Linde Aktiengesellschaft, a corporation of Germany
Filed Apr. 26, 1965, Ser. No. 450,913
Claims priority, application Germany, Apr. 24, 1964, G 40,447
4 Claims. (Cl. 60—53)

Our present invention relates to an adjustable hydrostatic-drive assembly of the type generally disclosed in copending application Ser. No. 445,585, filed April 5, 1965, by Karl Stolz, one of the present joint inventors, and U.S. Patent No. 3,107,491, issued October 22, 1963, to the common assignee of the present case and said copending application.

More particularly, this invention is directed to an improved adjustable hydrostatic drive wherein a hydrostatic pump and at least one hydrostatic motor, disposed in a common housing and connected in a fluid circuit, are provided with adjusting means including a fluid-operable servomechanism.

In many modern machines and especially automotive vehicles having hydraulic transmissions, the input shaft of the latter is coupled to an internal-combustion engine or some other prime mover; in these arrangements, it is often desirable to have a further hydraulic pump or other load-operating mechanism for operating hydraulic devices and the like throughout the mechanism. Thus, hydraulic power-lifting mechanisms, hydraulic cranes, swinging booms and the like, all require a further pump for the provision of fluid under pressure. In many cases, it is desirable that these further hydraulic pumps operate at a constant speed for efficient utilization of the fluid medium.

These further or secondary drives, such as hydraulic pumps, can be operated from the input shaft of the hydraulic transmission or from its output shaft.

In automotive vehicles, in which the internal-combustion engine drives the wheels via a stepped transmission, the vehicle speed must be controlled by regulating the rotational speed of the internal-combustion engine, i.e. the crankshaft thereof, so that any hydraulic pump for the lifting device must also be operated at a speed dependent upon the rotational speed of the engine when this pump is coupled with the input shaft of the drive. Moreover, it will be evident that the hydraulic pump is driven only at the "idling" speed of the engine when the vehicle is at standstill. This results in a very slow rate of pump displacement and load elevations, so that the vehicle operator must generally bring the engine to an elevated speed which, while increasing the operating rate of the pump, gives rise to a reduction in engine efficiency.

It is an important object of the present invention to provide a transmission assembly wherein the foregoing disadvantages can be obviated.

Another object of this invention is to provide a drive assembly adapted to operate loads requiring substantially constant operating rates and especially suitable for use in automotive vehicles or the like whose driven elements are generally operated at varying speeds.

Still a further object of this invention is to provide a hydrostatic-drive assembly extending the principles set forth in the commonly assigned earlier application mentioned above.

These objects and others which will become apparent hereinafter are attained, in accordance with the present invention, by a hydrostatic-drive assembly which, by virtue of its capability of continuous adjustment of the torque or speed ratio between the input and output shafts, permits the assembly to include an auxiliary shaft means (journaled in the enclosure formed by the housing for the hydrostatic pump and the hydrostatic motor), which is connectable with a mechanism adapted to operate a load in addition to that to which the output shaft of the hydrostatic transmission is coupled.

It is thus an important feature of the present invention that the housing, whose enclosure preferably forms a fluid reservoir for the hydrostatic pump and motor circuit, also has auxiliary shaft means journaled therein and operatively connected with the input shaft by a positive-drive means including at least one pair of meshing gears.

The hydrostatic drive or transmission can be provided, as is described generally in said copending application, with a servomechanism designed to replace or augment manual actuation of one adjustable member of the assembly (e.g. the swingable pump member and/or the motor member) the servomechanism being of the fluid-operated type and preferably having a positive displacement pump connected in the hydraulic circuit of the servomechanism; this auxiliary pump can be provided to supply the fluid pressure required for the servomechanism or to compensate for leakage losses therein. Servomechanisms of this general type are known and the specific construction of the operating elements thereof is not significant here. Suffice it to say that the servosystem includes, according to this invention, an auxiliary pump driven by the auxiliary shaft means for the purpose indicated. The latter is provided, according to a more specific feature of this invention, with an extension aligned with an opening formed in the housing and, preferably, in a wall of the cover thereof opposite the main housing portion upon which the pumps and auxiliary shaft means are mounted. The shaft extension is connectable with a load-operating mechanism external of the housing enclosure. The mechanism can, for example, be a further pump connected to a load such as a lifting device. Advantageously, the auxiliary shift means comprises a pair of axially extending shaft portions affixed to the moving member of the auxiliary pump (which is preferably of the gear type) and projecting in opposite directions therefrom, one of these portions being connected with the input shaft via at least one pair of gears while the other portion forms the aforedescribed extension. The extension may be so dimensioned that it is removable or terminates short of the opening in the housing cover so that this opening can be closed when operation of the further mechanism is not desired.

It will be noted, however, that the extension can project through this opening, whereupon the closure therefor can be effected by an annular member through which the extension passes. Moreover, the mechanism can be mounted directly upon the cover. The shaft extension, which can constitute part of the driven mechanism, can be removably recieved by a suitable connecting formation of the auxiliary shaft means.

This connecting formation can be a socket member in which the extension can be received in accordance with the present invention. Moreover, the ratio between the driving and driven gears connecting the input shaft of the hydrostatic transmission with the auxiliary shaft can be selected so as to provide the desired rate of rotation of the auxiliary shaft at the normal operating rate of the input shaft.

When the hydrostatic assembly is used for tractors or industrial vehicles (e.g. fork-lift trucks), the free extremity of the extension can project from the housing and serve as a power-takeoff shaft. The auxiliary shaft can thus be used to operate a variety of conventional devices normally driven by the power-takeoff shafts of these vehicles, such devices including winches and other loads in addition to the main load, i.e. the powered wheels of the vehicle.

The above and other objects, features and advantages of the present invention will become more readily apparent from the following description, reference being made to the accompanying drawing in which:

FIG. 2 is an elevational view of the assembly of FIG. 1 with a lateral wall of the housing removed;

FIG. 3 is a view similar to FIG. 2 illustrating another embodiment of the present invention;

FIG. 4 is a cross-sectional view taken generally along the line IV—IV of FIG. 3, and FIG. 5 is a diagram illustrating the several hydraulic networks of the present invention.

Figure 1:
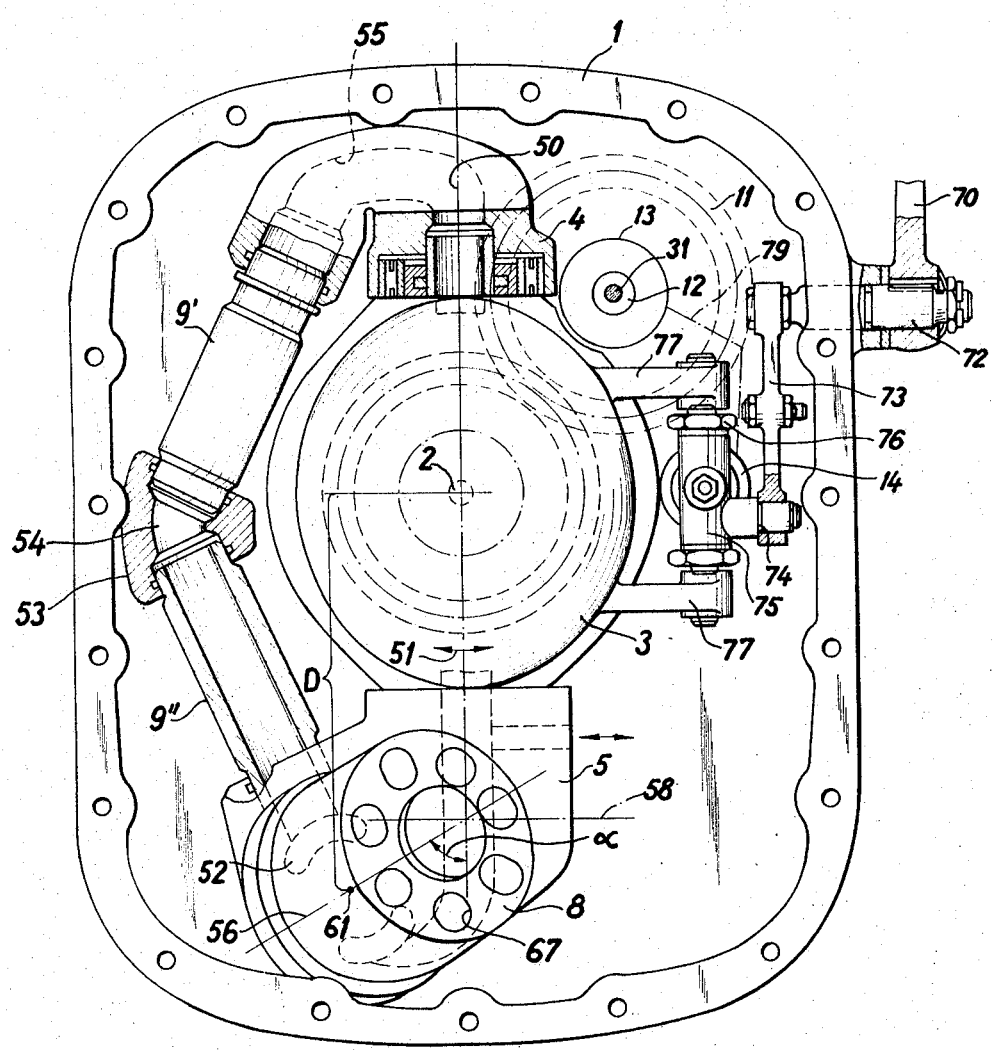
FIG. 1 is a plan view of a hydrostatic-drive assembly of the type described in the aforementioned copending application and embodying the present improvement, the cover being removed.

Referring first to FIG. 5, it can be seen that a hydrostatic drive of the type with which the present invention is concerned generally comprises a housing or reservoir R in which a hydrostatic pump P is displaceable to vary the stroke of its axial piston and thus the quantity of fluid displaced (during revolution of the input shaft IS) through a conduit means (represented at C) to the hydrostatic motor M. The output shaft OS of the latter can be connected with a load via universal joints, differential mechanisms and the like represented by the dot-dash line A. A suitable load may be the drive wheels W of an automotive vehicle (e.g. tractor, fork-lift truck). The hydraulic fluid is drawn into the pump P from the reservoir R via an inlet $i$ and is discharged at the motor side via an outlet $o$. The motor M can also be swingably displaced as will be apparent hereinafter. The actuating means for displacement of the pump member P can include a lever L, manually shiftable by the vehicle operator and/or a servomechanism S, whose piston PS' can swing the pump P in the manner described in the aforementioned copending application. The servomechanism can be of any conventional type, i.e. connected with the lever L or some other operating means which for example, displaces a control plunger, diagrammatically shown at PS", whose cylinder CS" is coupled with the servo-follower cylinder CS' by the hydraulic lines diagrammatically represented at H' and H". An auxiliary pump AP, whose shaft AS is positively coupled with the input shaft IS, supplies the hydraulic pressure fluid required by the servomechanism S or is otherwise connected to the servomechanism circuit via hydraulic line AH to compensate for fluid-leakage losses therefrom. The auxiliary pump AP is mounted in the reservoir R and draws hydraulic fluid therefrom, the leakage from the servosystem being discharged into the reservoir When the servosystem is of the dynamic type requiring a substantially constant flow of fluid, the return duct discharges into the reservoir. Moreover, an extension of the auxiliary drive shaft ASE extends out of the housing forming the reservoir R and can serve as a power-takeoff operating, for example, a further mechanism such as a winch or further pump FP whose load can be a working hydraulic cylinder LC, coupled with a lifting device such as the fork F of a fork-lift truck. While FIG. 5 illustrates in diagrammatic form the various elements of a system in accordance with the present invention, the structural relationships between these elements are illustrated in subsequently described embodiments (FIGS. 1, 2 and 3, 4, respectively).

In the system of FIGS. 1 and 2, which is constituted and operates in the manner more fully described in said commonly assigned copending application, a transmission housing 1 contains an input shaft 2, journaled therein and driving, via a swash plate, control disk or flange, the axially displaceable pistons of a cylinder drum within the housing of pump 3. The latter is pivotally mounted in a pair of journal blocks 4, 5 for swinging movement about an axis 50, as indicated by arrow 51, to change the angle at which the axes of the pistons intersect the plane of the control flange and thus the piston stroke. The control surface of the pump is coupled via a conduit means with the control surface 52 of the hydrostatic motor 8. This conduit means includes a pair of straight tubes 9', 9" sealingly received in intermediate member 53 whose passage 54 connects the tubes; the bearing block 4 has a passage 55 communicating with tube 9'. The intake (not shown) of the pump 3 opens into the reservoir chamber defined within the housing 1, while the discharge passage of the motor 8 likewise communicates with this reservoir chamber. It will be evident that the axis 56 of the motor 8 is inclined to the axial plane of the input and output shafts 2 and 6, the latter being journaled in a bearing 57 of the cover 7 of the housing. Thus, the projection of this axis 56 in the plane 57a perpendicular to the shafts 2 and 6 includes an angle $\alpha$ ranging between substantially 30° and 60° and preferably about 45° with the axial plane. The motor axis 56 is, moreover, inclined to the plane 58 of the axis 59 of the driven shaft 6 and forms an acute angle $\beta$ with the plane 57a. Moreover, the distance along the intersection of the axial plane with plane 57a between the axis 60 of shaft 2 and the axis 59 of shaft 6 (distance $d$) is less than the distance D between the axis 60 and the center 61 of the control surface of the motor 8. Most important, however, for the system of FIGS. 1 and 2 is the fact that the axis 50 about which the pump enclosure 3 is swingable lies in the common axial plane of shafts 2 and 6. This arrangement is highly compact and permits the overall dimensions of the unit to be relatively small. The shaft 6 is provided with a control flange 62 to which the axial pistons 63 of the cylinder drum 64 of the motor are connected by the usual ball joints, so that the cylinders 67 of the drum 64 successively communicates with the kidney-shaped openings of the control surface 52 of the motor 8.

The pump 3 can be tilted about its axis 50 by a manual control including a lever 70 keyed to a shaft 72 rotatably mounted in the main housing portion 1. An arm 73, carried by the shaft 72, is articulated at 74 to a crossmember 75 swivelably bridging a pair of arms 76; the latter are connected in turn to the arm 77 rigid with the pump body 3. A servo-follower cylinder 14 also is linked to the crossmember 75 and functions in a manner similar to that described with reference to the servocylinder CS' (FIG. 5). It should be understood, however, that cylinders CS' and CS" can be mounted in a similar unit and have a common piston member in a manner already known to the art of servopower-assist linkages.

According to an important aspect of the present invention, the input shaft 2 carries a driving gear 10 in mesh with the driven gear 11 of the auxiliary shaft means 12a, 12b, etc. more fully described hereinafter. The auxiliary shaft means comprises a pair of axially extending portions 12a and 12b projecting from opposite sides of a gear pump 13, which performs the functions of the auxiliary pump AP previously described. A duct represented by the dot-dash line 79 connects the auxiliary pump 13 with the servomechanism 14. The gear 11 is carried by the shaft portion 12a which is journaled at 80 in the housing 1 externally of the reservoir enclosure R. The gear chamber is formed by a cover 15 on the exterior of the housing. The auxiliary shaft means on the side of the gear pump 13, which can be of any conventional type, is a connecting formation such as a female or socket member matingly receiving the male member 31; the latter is a shaft extension whose end can be of prismatic configuration for rotatable entrainment by the similarly configured socket 12b. Any other connecting means suitable for the removable but rotatably interconnectable shaft portions 12b, 31 can be employed. The shaft extension can be journaled in a further bearing 81 in the cover 7, a further pump 30, suitable for operating the lifting mechanisms described previously, is mounted. Shaft 31 thus extends through the opening 7' in the cover 7 to the pump 30.

In the system of FIGS. 3 and 4, the input shaft 22 is shown to carry the gear 110 which meshes with a further drive gear 110' carried by a shaft 21 to which a source of motive power can be connected. The gear ratio in the transmission 110, 110' can be selected to provide optimum rotation rates for the shaft 22 of the adjustable hydrostatic pump 23, which is coupled with the hydrostatic motor 28 via a conduit 29. The hydrostatic pump and hydrostatic motor are both swivably mounted about respective pivots for adjustment of the axial pistons of their respective cylinder drums. A hydrostatic pump of the type shown at 23 in FIG. 3, for example, is described in the above identified U.S. Patent No. 3,107,491. This pump 23 and/or the motor 28 can be provided with a servomechanism 90 for tilting the pump to its positions illustrated in dot-dash lines in FIG. 3. A gear pump 91, behind the variable-stroke pump 23 in FIG. 3, supplies fluid to the servomechanism via a line 92 and is driven by a shaft 94a, 94b, the latter portion forming a socket for the extension 31 of a hydraulic pump 30 constituting the further "mechanism" of this embodiment.

Shaft portion 94a is journaled in the antechamber 115 of the housing 101 and carries a gear 111 in mesh with gear 110 of the pump 23. The ratio between the number of teeth of gears 110 and 111 is adjusted in accordance with the optimum desired relative drive rates of the auxiliary pump 91 and the further pump 30 with respect to the input shaft 22. The output shaft 26 of the hydrostatic motor 28 is connectable to the main load and is journaled in the housing cover 107. The operation of this system is of course similar to that previously described.

The invention as described an dillustrated admits of various modifications within the ability of persons skilled in the art without departing from the spirit and scope of the invention as defined in the appended claims.

We claim:
1. A hydrostatic-drive assembly comprising a housing forming an enclosure; a hydrostatic pump member in said enclosure having an input shaft extending therefrom; a hydrostatic motor member in said enclosure connected with said pump member for fluid operation thereby, said motor member having an output shaft extending from said enclosure for connection to a load, at least one of said members being swingably mounted on said housing for continuous adjustment of this torque ratio between said shafts; an auxiliary pump in said enclosure for hydraulic fluid; auxiliary shaft means journaled in said housing and operatively connected to said auxiliary pump while being coupled with said input shaft for driving said auxiliary pump, said housing having an opening aligned with said auxiliary shaft means; and a mechanism externally of said enclosure driven by said auxiliary shaft means through said opening operating a further load, said housing comprising a main housing portion and a cover removably mounted thereon, said input shaft and said auxiliary shaft means being journaled in a wall of said main housing portion, said opening being provided in a wall of said cover opposite said wall of said main housing portion, said mechanism being attachable to said cover.

2. A hydrostatic-drive assembly as defined in claim 1 wherein said mechanism is a further hydraulic pump.

3. A hydrostatic-drive assembly as defined in claim 2 wherein said auxiliary shaft means includes a first portion extending axially from said auxiliary pump in one direction and a second portion extending axially from said pump in the opposite direction, said assembly further comprising at least one pair of gears positively interconnecting said input shaft and one of said portions, the other of said portions extending in the direction of said opening.

4. A hydrostatic-drive assembly comprising housing means forming an enclosure, a hydrostatic pump in said enclosure having an input shaft extending therefrom; a hydrostatic motor in said enclosure connected with said pump for fluid operation thereby, said motor having an output shaft extending from said housing means; an auxiliary shaft in said enclosure operatively coupled with said input shaft; means for connecting said auxiliary shaft to a mechanism operable thereby; and auxiliary pump means in said enclosure driven by said auxiliary shaft, said auxiliary pump means having pump members formed with an extension of said auxiliary shaft directly connectable to said mechanism, said housing means being formed with an opening aligned with said extension of said auxiliary shaft, said mechanism being mounted externally on said enclosure in line with said opening, said extension projecting through said opening.

References Cited by the Examiner
UNITED STATES PATENTS

| 2,975,597 | 3/1961 | Arz | 60—53 |
| 3,142,963 | 8/1964 | Thoma | 60—53 |
| 3,163,987 | 1/1965 | Dowty et al. | 60—53 |

EDGAR W. GEOGHEGAN, *Primary Examiner.*